United State

Keneman et al.

[15] 3,680,060

[45] July 25, 1972

[54] ELECTRO-OPTICAL MEMORY EMPLOYING FERROELECTRIC ELEMENT

[72] Inventors: Scott Allen Keneman, Cranbury; Arthur Miller, Princeton Junction, both of N.J.

[73] Assignee: RCA Corporation, New York, N.Y.

[22] Filed: April 10, 1970

[21] Appl. No.: 27,336

[52] U.S. Cl. ....................................340/173.2, 340/173 LS
[51] Int. Cl. ....................................G11c 11/22
[58] Field of Search ..................340/173.2, 173 LT, 173 LM, 340/173 LS

[56] References Cited

UNITED STATES PATENTS

| | | | |
|---|---|---|---|
| 3,512,864 | 5/1970 | Haertling et al. | 340/173.2 X |
| 3,517,206 | 6/1970 | Oliver | 340/173.2 X |
| 3,374,473 | 3/1968 | Cummins | 340/173.2 |

OTHER PUBLICATIONS

Journal of Applied Physics " Electrical & Optical Properties of Ferroelectric $Bi_4Ti_3O_{12}$ Single Crystals" by Cummins et al.; 4/68; Vol. 39; No. 5 pages 2268–2274

Journal of Applied Physics " Existence and Origin of a Polarization Threshold Field in Bismuth Titanate" by Hamilton; 1/67; Vol. 38; No. 1 pages 10–12

*Primary Examiner*—Stanley M. Urynowicz, Jr.
*Attorney*—H. Christoffersen

[57] ABSTRACT

A photoconductive-ferroelectric device is employed as an erasable storage medium for recording and reading light patterns. The ferroelectric material may be a bismuth titanate crystal and its polarization pattern (corresponding to the recorded light pattern) is read out by directing linearly polarized light at the *ab*-face of the crystal, at an angle to the *c*-axis of the crystal and preferably perpendicular to the *b*-axis of the crystal. With proper choice of the direction of linear polarization, the incident light is phase delayed different amounts in the differently polarized regions of the crystal and this difference in phase may be detected and employed as the basis for reconstructing the light pattern. Operation in this way is found to provide substantially greater readout efficiency than has been available heretofore.

7 Claims, 10 Drawing Figures

INVENTORS
SCOTT A. KENEMAN &
ARTHUR MILLER
BY
Attorney

INVENTORS
SCOTT A. KENEMAN &
BY ARTHUR MILLER
Samuel Cohen
attorney

INVENTORS
SCOTT A. KENEMAN &
ARTHUR MILLER
BY Samuel Cohen
Attorney

ELECTRO-OPTICAL MEMORY EMPLOYING FERROELECTRIC ELEMENT

STATEMENT

The invention herein described was made in the course of or under a contract or subcontract thereunder with the Department of the Air Force.

BACKGROUND OF THE INVENTION

U.S. Pat. No. 3,374,473 issued Mar. 19, 1968 to S. E. Cummins describes a ferroelectric material, bismuth titanate ($Bi_4Ti_3OB12$), and devices and systems in which this material is used for the storage of information. So that the reader may be able more easily to understand the contribution of the present invention, a number of the operating principles discussed in the Cummins patent are reviewed briefly here.

BRIEF DESCRIPTION OF THE DRAWING

FIG. 1 illustrates a single crystal 10 of bismuth titanate located between two transparent conductors 12 and 14 respectively. The directions of the three monoclinic axes are shown as *a*, *b*, and *c*, respectively. The major surface resulting from the growth habit of bismuth titanate is in the *ab*-plane.

Figure 1:
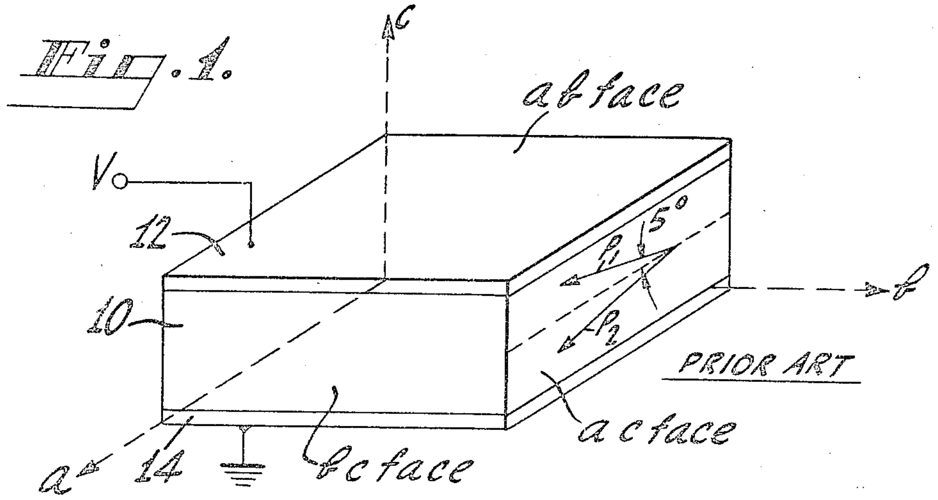
FIG. 1 is a perspective showing of a bismuth titanate device known in the prior art.

Bismuth titanate is a ferroelectric material and it exhibits a spontaneous polarization which is represented in FIG. 1 by the vector $P_1$. This material when polarized in this way can be said to be in one remanent storage state which for purposes of convenience is herein termed the $P_1$ state. The direction of this polarization is about 5° from the *a*-axis and the vector lies in the *ac*-plane. The direction of polarization may be changed to that indicated by the vector $P_2$, by the application in a direction parallel to the *c*-axis of a voltage level or pulse V of greater than a given threshold value and of positive polarity. Upon removal of the pulse, the bismuth titanate 10 remains polarized in its new remanent state $P_2$. By applying a relatively negative voltage level or pulse V across the electrodes 12 and 14 the polarization state of the bismuth titanate again may be changed to that represented by vector $P_1$ . Again, upon removal of the voltage, the ferroelectric material retains its new polarization state $P_1$.

The change in the direction of the polarization vector P of the ferroelectric material of FIG. 1 is accompanied by a corresponding change in the orientation of the optical indicatrix of the crystal about its *b*-axis, between two stable angular positions, as discussed in detail in the Cummins patent. As explained there, if linearly polarized light is applied to the *ab*-face of the crystal, at some special polarization angle relative to say the principle axis of this optical indicatrix, it passes through the crystal with its plane of polarization unaffected. If, however, this incident light has a plane of polarization which is different than this special direction, the light is resolved into two orthogonally related, linearly polarized components which travel through the crystal at two different velocities. This light, in other words, when it emerges from the crystal, has been changed from linearly polarized light to elliptically polarized light.

Figure 2:
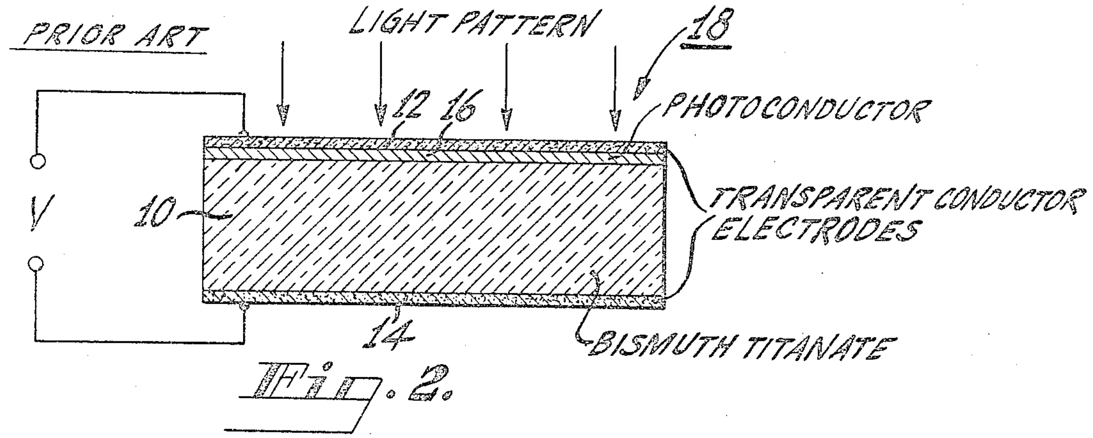
FIG. 2 is a cross-section through a known bismuth titanate device suitable for storing a light pattern.

FIG. 2 illustrates how a light pattern may be stored in a bismuth titanate crystal. The structure of the device 18 shown is similar to that of FIG. 1 with the addition of a substantially transparent, photoconductive layer 16 between the transparent conductor 12 and the bismuth titanate 10. If the bismuth titanate initially is in remanent state $P_1$ and a voltage V is applied across the crystal in a direction which tends to change the polarization of the crystal to its $P_2$ state, a light pattern may be stored. The portions of the light pattern which are bright cause the regions of the photoconductor they reach to change their resistivity to a relatively low value and this permits a relatively high value of electric field to be applied across the bismuth titanate. At these regions of the light pattern, the bismuth titanate is switched from its $P_1$ to its $P_2$ state. In the regions of the light pattern which are relatively dark, the photoconductor resistance is relatively high so that the electric field which develops across the crystal is relatively low. In these regions, the bismuth titanate crystal remains in its initial polarization state $P_1$.

Figure 3:
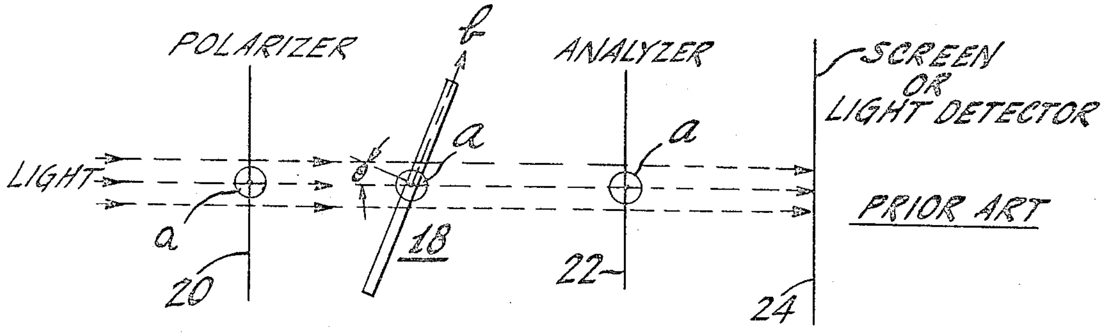
FIG. 3 is a schematic showing of a known system for optically reading the information stored in a bismuth titanate crystal.

An arrangement for reading out a stored pattern discussed by Cummins is shown in FIG. 3. The structure 18 of FIG. 2, which is shown only schematically in FIG. 3, is tilted about its *a*-axis so that the normal to the *ab*-face of the crystal is at an angle $\theta$ to the incident light. (Within the crystal, the light is refracted and the angle $\theta_m$ (not shown in FIG. 3) between the refracted beam and the normal to the *ab*-face is smaller than $\theta$). The incident light is passed through a polarizer 20. The linearly polarized component of the light is applied from the polarizer through the transparent films 12 and 16 (FIG. 2) to the *ab*-face of the bismuth titanate crystal. The light passing through the crystal is applied to an analyzer 22 and then to an element 24 which may be a screen or which may be a light detector.

Figure 4:
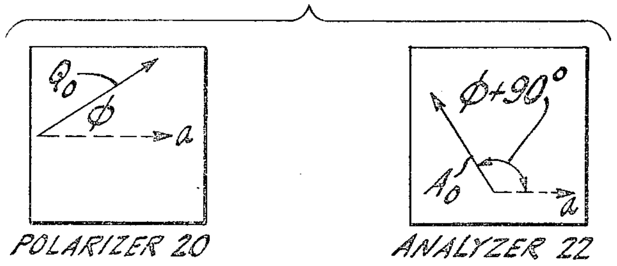
FIG. 4 is a schematic showing of the polarizer and analyzer of the system of FIG. 3 in which the polarization directions are indicated.

Assuming a light pattern is stored in the bismuth titanate, certain portions of the crystal are polarized in the direction $P_1$ and other portions in the direction $P_2$. The polarizer 20 preferably is located perpendicular to the light beam and parallel to the *a*-axis. The direction relative to the *a*-axis in which the polarizer 20 linearly polarizes the incident light may be as indicated by vector $Q_0$ shown in FIG. 4. This vector is at an angle $\phi$ to the *a*-axis, where $\phi$ is determined by the angle $\theta_m$ in the crystal between the light passing through the crystal and the *c*-axis. The analyzer 22 is "crossed" with respect to the polarizer 20. In other words, its polarization axis is at right angles to that of the polarizer 20.

Figures 5, 6, 7, 8:
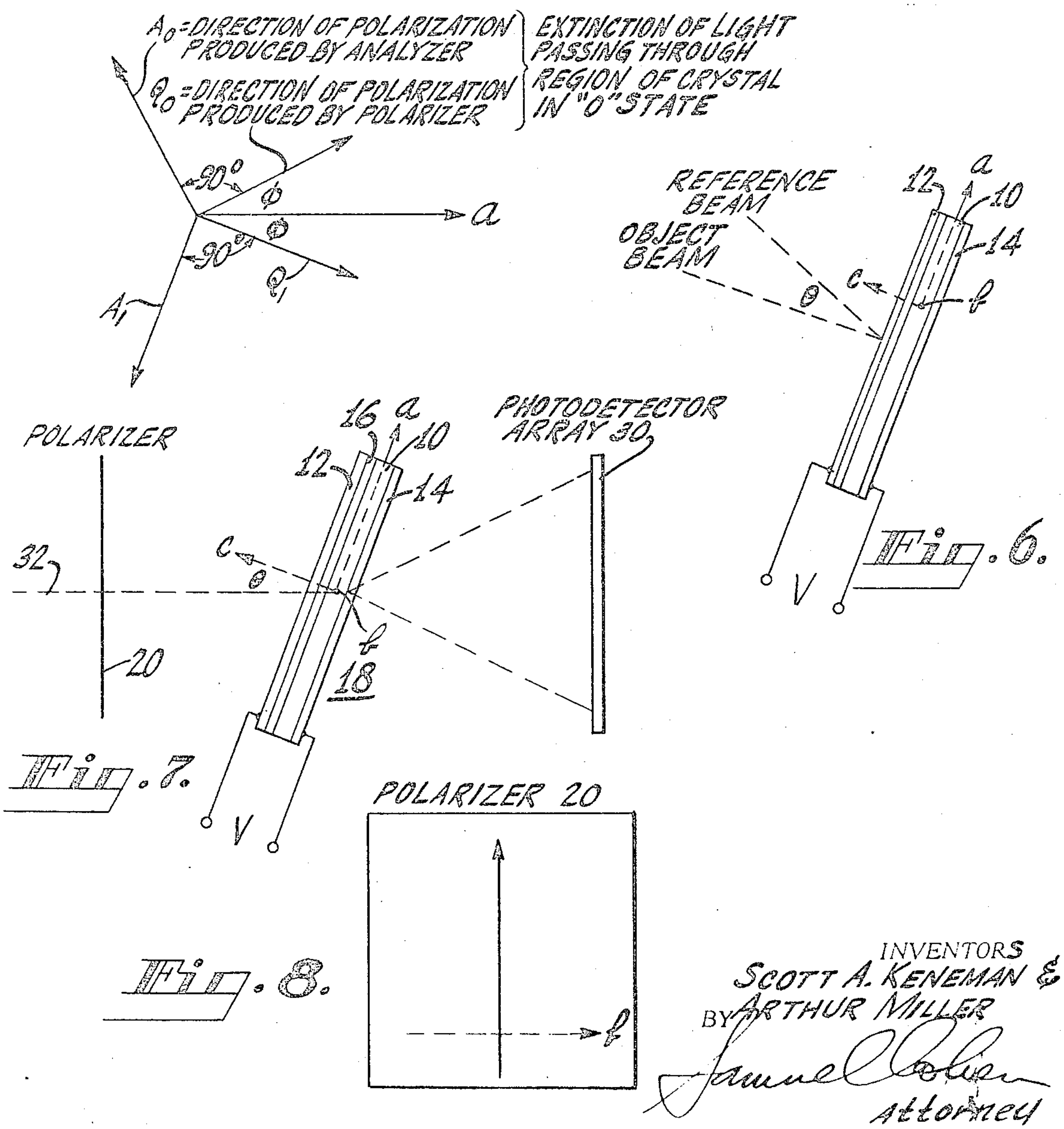
FIG. 5 is a vector diagram to help explain the operation of the system of FIG. 3.
FIG. 6 is a schematic showing of how a hologram may be stored as an electrical polarization pattern in a bismuth titanate crystal.
FIG. 7 is a schematic showing of a readout system for a bismuth titanate crystal in accordance with the present invention.
FIG. 8 is a schematic showing of the polarizer of FIG. 7 with the polarization direction indicated.

In operation, assume that the light polarized at an angle $\phi$ to the *a*-axis, as shown at $Q_0$ in FIG. 5, is shining through a region of the crystal whose polarization is in a state which arbitrarily is called the "zero" state. The direction of polarization of the light emerging from the crystal will be the same as that of the light incident on the crystal. In other words, as the direction of linear polarization of the light is the same as that of the "extinction direction" of the crystal (which is a function of $\theta_m$), the polarization of this light is not affected. However, this direction of polarization is at right angles to the direction of orientation $A_0$ of the analyzer 22. Therefore, this light is blocked or extinguished by the analyzer 22.

Assume now that the light linearly polarized as indicated at $Q_0$ passes through a region of the crystal polarized in the "one" state. This linearly polarized light is resolved into two orthogonally related components and, as already mentioned, these components pass through the crystal at different velocities. The result is that the light emerging from the crystal is elliptically polarized and a portion of this light passes through the analyzer 22 to the screen or light detector 24.

It is also possible to operate the system of FIG. 3 by orienting the polarizer 20 so that it produces light linearly polarized as indicated at $Q_1$ in FIG. 5. In this case, the analyzer would be oriented as indicated schematically by the vector $A_1$ in FIG. 5. In the operation of such a system, the portions of the crystal in the "one" state would not affect the angle of polarization of the incident light and the analyzer 22 would extinguish this light. On the other hand, the regions of the crystal in the zero state would cause the incident linearly polarized light to become elliptically polarized and a portion of this light would pass through the analyzer. For a given stored polarization pattern in the crystal, the difference between what is read out in this last mode of operation and what is read out in the first mode of operation corresponds to the difference between the positive and the negative of a photograph.

Detailed experimental and mathematical studies have shown that the read out efficiency of the system of FIG. 3 is relatively low. The read out efficiency is proportional to the degree of ellipticity produced in the light passing through the crystal. What is being considered here, of course, is that light passing through the crystal which it is intended not be extinguished by the analyzer 22.

The conversion efficiency of the FIG. 3 system has been found to depend upon two factors. One is the phase retardation of one of the light components relative to the other and this has to do with the thickness of the crystal in the direction in which light is passing through the crystal. The other has to do with the angle $2\phi$ (see FIG. 5) between "extinction directions." This second factor, in other words, is dependent on the angle between the direction of polarization of the incident light which can be fully extinguished by a region of the crystal in the "zero" state and a suitably oriented analyzer and the direction of polarization of the incident light which can be fully extinguished by a region of the crystal in the "one" state and a suitably oriented analyzer.

For purposes of the present discussion, it can be stated that the conversion efficiency E of the system depicted in FIG. 3 is roughly equal to:

$$E \approx \sin^2(4\phi)\sin^2[\pi d(\Delta n)/\lambda]$$

where:

$\Delta n$ is the difference in index of refraction experienced by the two components of the elliptically polarized light, $\lambda$ is the wavelength of the light, and $d$ is the thickness of the crystal in the direction of the light ray.

While it is clear that the second term in the equation above may be optimized to one by choosing a bismuth titanate crystal of appropriate thickness, the first term is severely limited by the low values of $\phi$ which must be employed. This angle $\phi$ is dependent on $\theta_m$ and while it is not necessary for purposes of the present discussion to provide the complete mathematical treatment, it can be shown, as a practical matter, that $\theta$ should be about 10°–20°, giving a $\theta_m$ of about 4°–8°. The reasons have to do with the refraction which occurs within the crystal (even at grazing incidence (90°), $\theta_m$ is only about 23°) and the losses in light suffered due to reflections from the surface become very large as the angle $\theta$ is made large. The angle $\theta_m$ can be increased by the use of additional optical elements, but this would increase the expense of the system. The angle $\phi$ is related to $\theta_m$ and it can be shown that with an angle $\theta_m$ equal to about 5° the angle $2\phi$ is roughly equal to about 0.6°.

BRIEF SUMMARY OF THE INVENTION

The discovery has been made that with a change in storage medium orientation a very different mode of operation than that described above results and the efficiency of readout is greatly increased. During readout, rather than tilting the storage medium such as the bismuth titanate crystal about the $a$-axis relative to the light beam directed toward the $ab$-face of the crystal, it is tilted instead about an axis at a substantial angle in the $ab$-plane to the $a$-axis. Optimally this angle is 90° making the $b$-axis the one about which the tilting occurs. The effect of operating in this way is to align the extinction directions of the two polarization states of the crystal relative to the incident light. If now the direction of linear polarization of the incident light is judiciously chosen (perpendicular to the $b$-axis in the case of the bismuth titanate crystal), the light passing through the crystal is not changed from linearly to elliptically polarized light. Instead, those portions of the crystal polarized in the "one" state cause the linearly polarized light to travel at one velocity and those portions polarized in the "zero" state cause the linearly polarized light to travel at a different velocity. Thus, some components of the incident light are phase delayed relative to the others and this difference in phase may be employed very usefully for example, for reconstructing a stored electrical polarization hologram pattern.

DETAILED DESCRIPTION

FIG. 6 shows how a hologram may be stored in a bismuth titanate device such as shown in FIG. 2. An object beam derived from a coherent light source such as a laser is directed at the electrode 12 and a reference beam derived from the same coherent light source is also directed at electrode 12. As well understood in the art, these two beams create an interference pattern consisting of light and dark areas which can be stored as a hologram. During the time these beams are directed at the electrode 12, a voltage level or pulse is applied across the two electrodes 12 and 14 to cause a polarization pattern of the hologram to develop in the bismuth titanate material and when the voltage is removed, this charge pattern remains stored.

A readout system according to the present invention is illustrated in FIG. 7. The polarizer 20 is similar to that already described in FIG. 3 as is the bismuth titanate structure 18. However, rather than being tilted about the $a$-axis relative to the incoming light beam the structure 18 is instead tilted about another axis at a substantial angle to the $a$-axis and which optimally is the $b$-axis, as shown. The polarizer is oriented to produce a linearly polarized wave which optimally is at an angle of 90° to the $b$-axis, as shown in FIG. 8. The analyzer of FIG. 2 is not employed. Instead, a photodetector array 30 or other light detection means is located at the position of the image reconstructed from the hologram.

It has been discovered that in the operation of the system of FIG. 7, there is no change in the angle of polarizAtion made by the light passing through the ferroelectric crystal (a mathematical treatment is given later). Instead, those portions of the crystal in the "one" state cause the linearly polarized light to have one velocity through the crystal and those portions of the crystal in the "zero" state cause the linearly polarized light to have a different velocity through the crystal.

An important difference between this readout mode of operation and the one previously discussed is that regardless of the value of $\theta$ (or $\theta_m$), a crystal thickness can be chosen to make the readout "efficiency" (defined previously and discussed at greater length later) unity, although choice of an optimum thickness, as a practical matter, may not be desirable for other reasons. For example, where extremely high resolution is desired, a compromise is in order between making the crystal of the thickness required for unity efficiency and making the crystal as thin as possible, while still retaining sufficient physical strength to withstand reasonable handling, to provide maximum resolution.

The present mode of operation is very suitable for use in reconstructing a phase hologram. The readout beam 32 (which preferably is a laser beam at the same frequency as the write laser beam) is directed at the surface of the electrode 12 at an angle $\theta$ which is conjugate to the angle $\theta$ made by the reference beam during the production of the hologram. The result of shining this light onto the structure 18 is to reconstruct the image of the hologram at a position complementary to that at which the object was located when the hologram was formed.

The storage device shown in FIG. 7 is especially suitable for use as a computer memory. In this use, a small (perhaps 10 centimeter square) structure such as shown in FIG. 8 may be employed to store perhaps 100 × 100 "pages" of information. Each such page may consist of from 100 × 100 to upwards of 1000 × 1000 bits, each bit being represented in the original of its page-the object, as a transparent or an opaque indication, depending on its binary value. The photodetector array contains the same number of photodetector devices, such as photodiodes, as there are bits on a page. When a hologram is reconstructed, the reconstructed image of each small transparent or opaque area superimposes over one of the photodiodes so that in the case of each clear area representing say a "one," a photodiode is energized and in the case of the opaque areas representing "zeros," the corresponding photodiodes are not energized.

Figures 9, 10:
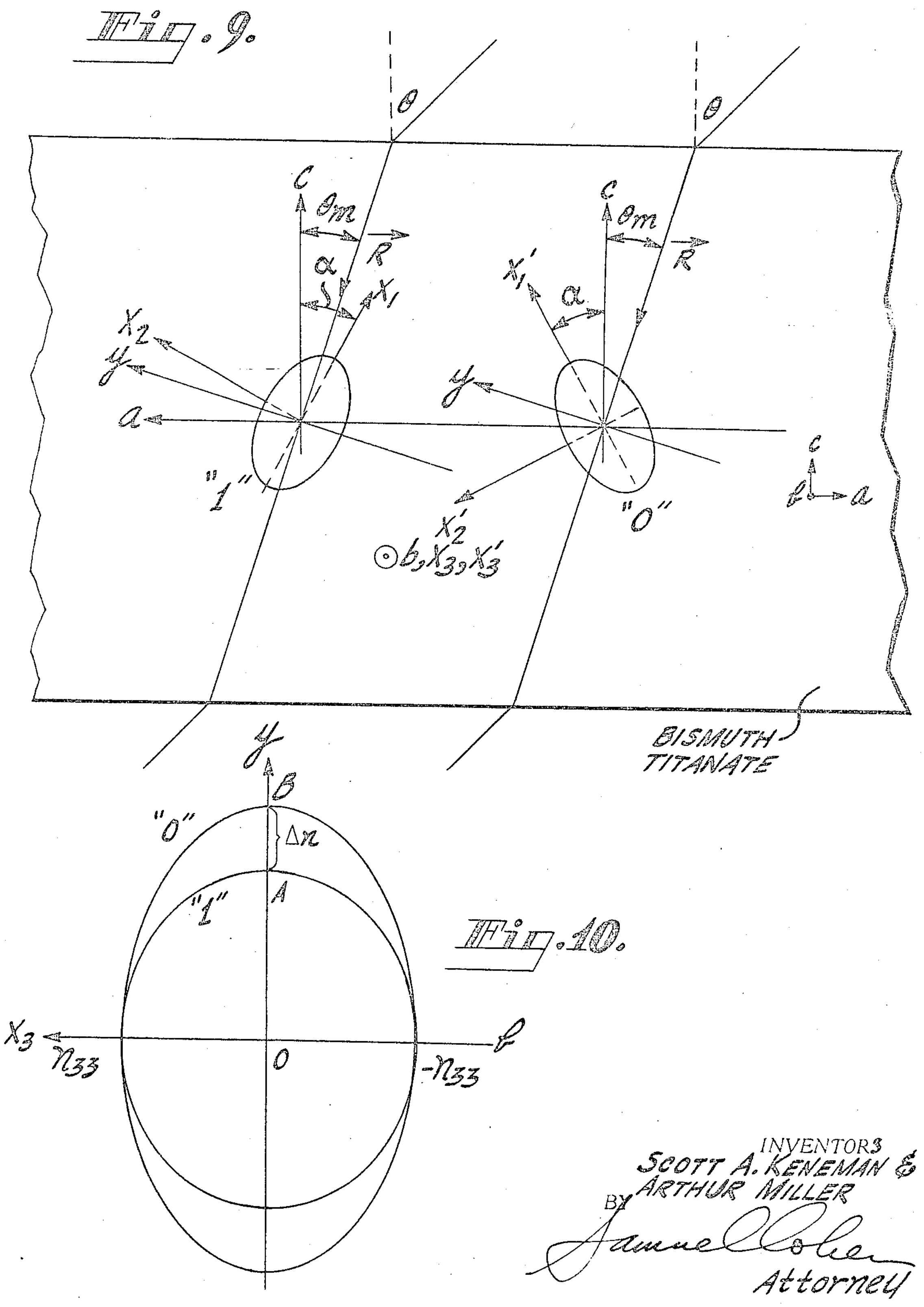
FIGS. 9 and 10 are diagrams that help explain the operation of the readout system of the present invention.

The optical characteristics of the system of FIG. 7 may be better understood from the diagrams of FIGS. 9 and 10 and the equations which follow. FIG. 9 illustrates the optical properties, during phase readout, for the device 18 of FIG. 7, as viewed along the $b$-axis. $x_1, x_2, x_3$ are axes corresponding to the polarization of the crystal in the one state while $x_1', x_2', x_3'$ correspond to polarization of the crystal in the "zero" state.

As contrasted to the prior art (FIG. 5) where the extinction direction (such as $Q_1$) of the material in one polarization state is at an acute angle $2\phi$ to the extinction direction (such as $Q_2$) of the material in the other polarization state, FIG. 10 shows that the two axes OA and OB of the FIG. 7 system are aligned! Thus, it is possible, in the system of FIG. 7, by judicially choosing the direction of linear polarization of the incident beam, (for example, by making that direction the same as that of the OA- and OB-axes-a direction perpendicular to the $b$-axis), to cause that incident beam to retain its original angle of polarization when passing through the crystal, regardless of the polarization state of the crystal. However, as the lengths of the axes OA and OB indicate, the refractive indices in the two polarization states differ by an amount $\Delta n$. Therefore, the differently polarized regions of the crystal will delay such an incident light beam different amounts.

The value of $\Delta n$ may be calculated in the following way.

The optical indicatrices of the "one" and "zero" states of the crystal are given respectively by:

$$(x_1^2)/(n_{11}^2)+(x_2^2)/(n_{22}^2)+(x_3^2)/(n_{33}^2)=1 \quad (1)$$

and $$(x_1')^2/(n_{11}^2)+(x_2')^2/(n_{22}^2)+(x_3')^2/(n_{33}^2)=1 \quad (2)$$

where: $n_{11}$ = index of refraction in $x_1$ direction for the light projected along the $b$-axis $n_{22}$ = index of refraction in $x_2$ direction for light projected along the $b$-axis $n_{33}$ = index of refraction in $x_3$ or $b$ direction for light in the $x_1$ or $x_3$ direction. The transformations between the primed and unprimed coordinates are:

$$x_1' = x_1(\cos 2\alpha) + x_2(\sin 2\alpha)$$

$$x_2' = -x_1(\sin 2\alpha) + x_2(\cos 2\alpha) \quad (3)$$

$$x_3' = x_3$$

Let the $y$ axis be defined as perpendicular to the $b$-axis and to the wave normal R. The different cross sections through the respective ellipses, which cross-sections exist in the $x_3y$-plane, can be observed by inspection in FIG. 3 to be of different size, and these cross-sections are shown superimposed in FIG. 10. (FIG. 10 is in the $x_3y$-, that is, the $by$-plane).

Given a point $(x_3, y)$ in the $x_3y$ plane, $$x_1 = [-\sin(\alpha-\theta_m)]y$$
$$x_2 = [\cos(\alpha-\theta_m)]y \quad (4)$$

$$x_1' = [\sin(\alpha+\theta_m)]y$$
$$x_2' = [\cos(\alpha+\theta_m)]y \quad (5)$$

By substituting Eq. (4) into Eq. (1) and Eq. (5) into Eq. (2) and setting $x_3=0$, points A and B shown in FIG. 10 may be determined. The difference in index of refraction, $\Delta n$, is then given by $$\Delta n = B - A \quad (6)$$

where $$A = \left[\frac{\sin^2(\alpha-\theta_m)}{n_{11}^2} + \frac{\cos^2(\alpha-\theta_m)}{n_{22}^2}\right]^{1/2} \quad (7)$$

$$B = \left[\frac{\sin^2(\alpha+\theta_m)}{n_{11}^2} + \frac{\cos^2(\alpha+\theta_m)}{n_{22}^2}\right]^{-1/2} \quad (8)$$

Hence, $$A = \frac{n_{22}}{\left[1-\left(1-\frac{n_{22}^2}{\bar{n}_{11}^2}\right)\sin^2(\alpha-\theta_m)\right]^{1/2}} \quad (9)$$

Noting that $$\left(1-\frac{n_{22}^2}{n_{11}^2}\right) \ll 1,$$

$$A \approx n_{22}\left[1+\frac{1}{2}\left(1-\frac{n_{22}^2}{n_{11}^2}\right)\sin^2(\alpha-\theta_m)\right] \quad (10)$$

Similarly, $$B \approx n_{22}\left[1+\frac{1}{2}\left(1-\frac{n_{22}^2}{n_{11}^2}\right)\sin^2(\alpha+\theta_m)\right] \quad (11)$$

Therefore, $$\Delta n = B - A \approx \left(\frac{n_{22}}{2}\right)\left(1-\frac{n_{22}^2}{n_{11}^2}\right)[\sin^2(\alpha+\theta_m] - \sin^2(\alpha-\theta_m)] \quad (12)$$

Since $\sin^2 x = \frac{1}{2}(1-\cos 2x)$ and $\cos x - \cos y = -2\sin[(x+y)/2]\sin[x-y)/2]$, $$\Delta n \approx \left(\frac{n_{22}}{2}\right)\left(1-\frac{n_{22}^2}{n_{11}^2}\right)\sin 2\alpha \sin 2\theta_m \quad (13)$$

But $$\frac{n_{22}}{2}\left(1-\frac{n_{22}^2}{n_{11}^2}\right) \approx (n_{11}-n_{22}) \quad (14)$$

Hence, $\Delta n \approx (n_{11}-n_{22})(\sin 2\alpha)(\sin 2\theta_m)$. (15)

As may be seen from Eq. (15), $\Delta n$ is maximized by selecting $\theta_m = 45°$. However, in practice, unless compensating optical elements are employed at the air-transparent electrode interface of the device 12, 16, 10, 16 of FIG. 7, $\theta_m$ is a substantially smaller value than this for the same reasons mentioned briefly in the introductory portion of this application.

From the above equations, calculations may be made of the relative readout efficiencies of the systems of FIG. 7 and 3.

The readout efficiency of the system of FIG. 3 previously has been shown to be proportional to:

$$\sin^2(4a\mathrm{F})\sin^2[\pi d(\Delta n)/\lambda] \qquad (16)$$

Assuming the system of FIG. 3 is optimized, that is, assuming that the thickness of the crystal has been chosen so that the last term has the value 1, expression 16 becomes:

$$\sin^2 4\phi \qquad (17)$$

It can be shown that the readout efficiency of the system of FIG. 7 is proportional to:

$$\sin^2[\pi d(\Delta n)/\lambda] \qquad (18)$$

The relative efficiencies of the two systems therefore are:

$$E\,(\text{FIG. }7)/E\,(\text{FIG. }3)=\sin^2[\pi d(\Delta n)/\lambda]/\sin^2 4\phi \qquad (19)$$

Substituting Eq. 15 into 19 gives:

$$\frac{E\,(\text{FIG. }7)}{E\,(\text{FIG. }3)}=\frac{\sin^2\left[\dfrac{\pi d\,(n_{11}-n_{22})\,\sin 2\alpha\,\sin 2\theta_m}{\lambda}\right]}{\sin^2 4\phi} \qquad (20)$$

Assume the following practically realizable values for the terms of equation 20.

$\theta_m = 5°$ (this corresponds to $\theta = 12.6°$ in air)

$d$ = 1 mil (This is a practical lower limit due to crystal fragility. It should be pointed out that in the present application where extreme line resolution is required, it is important that the crystal be as thin as possible).

$\lambda$ = 5,000 A.

$\phi = 0.15°$ (since $\theta_m = 5°$)

$n_{11}-n_{22} = 0.0126$ $$\frac{E\,(\text{FIG. }7)}{E\,(\text{FIG. }3)}=\frac{\sin^2\left[\dfrac{\pi\,(25\mu)\,(0.0126)\,(\sin 50°)\,(\sin 10°)}{.5\mu}\right]}{[\sin^2(0.6°)]} \qquad (21)$$

$$=\frac{\sin^2(15.2°)}{\sin^2(0.6°)}=630 \qquad (22)$$

The system of FIG. 7 has been operated and the measurements actually made already have shown it to be more than an order of magnitude more efficient than the system of FIG. 3. While this is a remarkable improvement and while it is expected that even greater efficiencies will be achieved, the reasons for the difference between the observed and calculated values are not yet fully understood.

While in the preferred form of the invention the incident light is linearly polarized, the invention also is operative with unpolarized light. Here, that component of the light oriented in the direction parallel to the "extinction direction" in which the indices of refraction differ by $\Delta n$ will be affected as already discussed.

While the invention has been discussed, by way of example, in connection with a single material, namely bismuth titanate, which because of its crystal growth habit is believed at the present time to be preferred material, the invention is not restricted to this material. The invention, for example, will work with other ferroelectric materials in which one may obtain non-180° switching of stored electrical polarization (in other words, the angle between $P_1$ and $P_2$ of FIG. 1 should not be 180°). However, in other materials cutting the material in an appropriate way to obtain the required write geometry may be difficult. Examples of suitable materials, when properly cut to obtain the desired geometry (different indices of refractions for the two polarization states for a given light beam direction), are barium titanate and the trigonal boracites. The latter are discussed in "Trigonal Boracites - A New Type of Ferroelectric . . . " by H. Schmid, Abstracts for the 2nd International Meeting on Ferroelectricity, Kyoto, Japan, pg. 66, Sept. 1969.

What is claimed is:

1. A method of reading the polarization pattern stored in a crystal of bismuth titanate which has *a*-, *b*- and *c*-axes comprising the step of directing a beam of light which is linearly polarized at the *ab*-face of the crystal in a direction at a substantial angle to the *b*-axis, at an acute angle to the *c*-axis and at acute angle to the *a*-axis, and the further step of sensing the difference in phase between the portion of the light passing through a region of the crystal polarized in one sense and a region polarized in another sense.

2. The method of claim 1 where said substantial angle is approximately 90° and the beam of light is polarized at a substantial angle to the *b*-axis.

3. The method of claim 1 in which the pattern stored is a holographic charge pattern, the frequency of the beam of light and the acute angle between the beam of light and the c-axis being such as to reconstruct the image stored as the holographic charge pattern, and further including the step of sensing the reconstructed image.

4. A system for reading out the charge pattern stored in a ferroelectric device having *a*, *b* and *c* axes and of the type the electrical polarization states of which are optically indistinguishable for light directed normal to the ab surface of the material comprising, in combination:

means for directing a beam of light linearly polarized substantially normal to said *b*-axis and at an acute angle to said *a* axis, at the *ab*-face of the device and in a direction substantially normal to said *b*-axis and at an acute, non-zero angle $\theta$ to the normal to the ab-face of the device; and means receptive of the light passing through said device and responsive to the difference in phase between the portion of the light passing thrOugh the part of the device in one polarization state and that passing through the part of the device in another polarization state.

5. A system as set forth in claim 4 wherein the device comprises a bismuth titanate crystal.

6. A system as set forth in claim 5 wherein the thickness along the *c*-axis of said crystal is of the order of $10^{-3}$ inches.

7. A method of reading out a polarization pattern stored in a material having two electrical polarization states which are optically indistinguishable for light directed normal to the principal surface of the material and which is capable of being charged to said two different polarization states and which can be oriented in a direction such that the fast and slow birefringent directions for one direction of polarization are aligned with those for its other direction of polarization comprising the steps of:

orienting the material in the way described above with reference to an incident light beam directed at said principal surface and which is linearly polarized in a direction substantially smaller than 90° to said aligned directions; and detecting the difference in phase produced when the light passes through the regions of the material in said two polarization states.

* * * * *